United States Patent [19]

Bowman

[11] 4,408,799
[45] Oct. 11, 1983

[54] INFINITELY VARIABLE SEAT BACK RECLINER

[75] Inventor: James A. Bowman, Georgetown, Ky.

[73] Assignee: Hoover Universal, Inc., Ann Arbor, Mich.

[21] Appl. No.: 277,416

[22] Filed: Jun. 25, 1981

[51] Int. Cl.³ .............................................. A47C 1/027
[52] U.S. Cl. .................................. 297/361; 297/374; 16/242; 16/342
[58] Field of Search ..................... 297/361, 374, 376; 16/239–241, 242, 245, 342, 339, 340

[56] References Cited

U.S. PATENT DOCUMENTS

| | | | |
|---|---|---|---|
| 3,633,964 | 1/1972 | Bertin | 297/375 |
| 4,291,914 | 9/1981 | Mizelle | 297/361 |
| 4,332,418 | 6/1982 | Strowik | 297/374 X |

*Primary Examiner*—William E. Lyddane
*Attorney, Agent, or Firm*—Stephenson and Boller

[57] ABSTRACT

A seat back recliner comprises an infinitely variable mechanism which positions the seat back angularly relative to the seat cushion about a hinge axis in one-to-one correspondence with operation of an operating lever. Once the seat back has been positioned to a desired setting by operation of the lever, the seat back remains in the selected position. External torques applied to the seat back about the hinge axis tending to displace the seat back from the selected position are resisted by a locking action between wedging members in the infinitely variable mechanism. When it is desired to position the seat back, operation of the lever is effective to rotate the seat back to the desired position while concurrently interacting with the wedging members so as to prevent the wedging members from disallowing the desired rotation.

23 Claims, 5 Drawing Figures

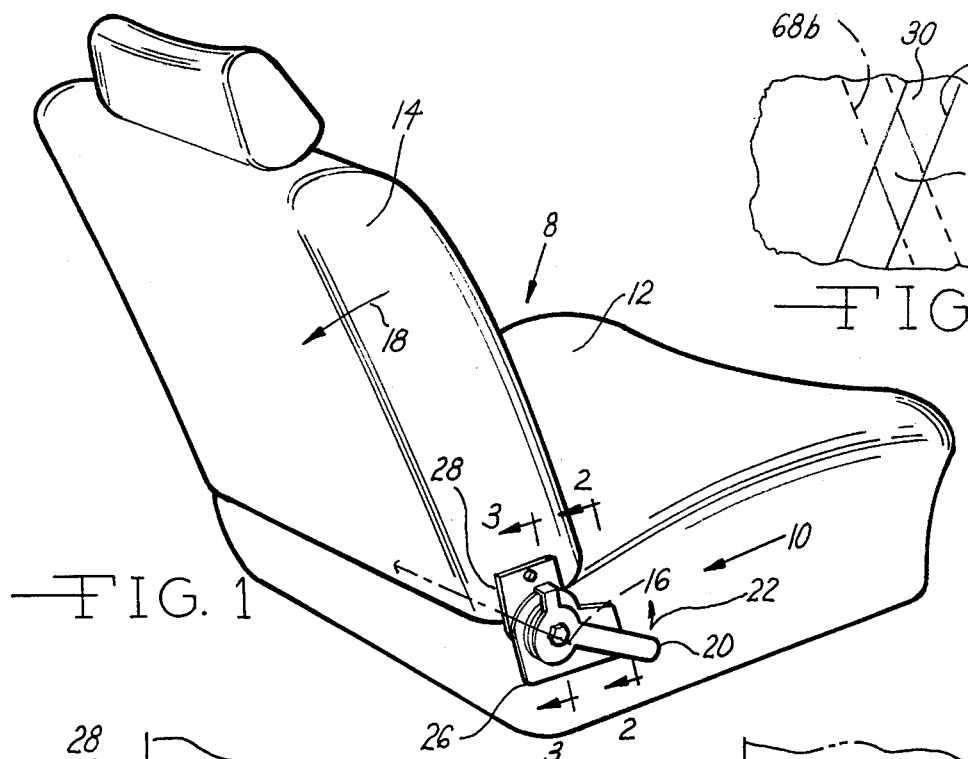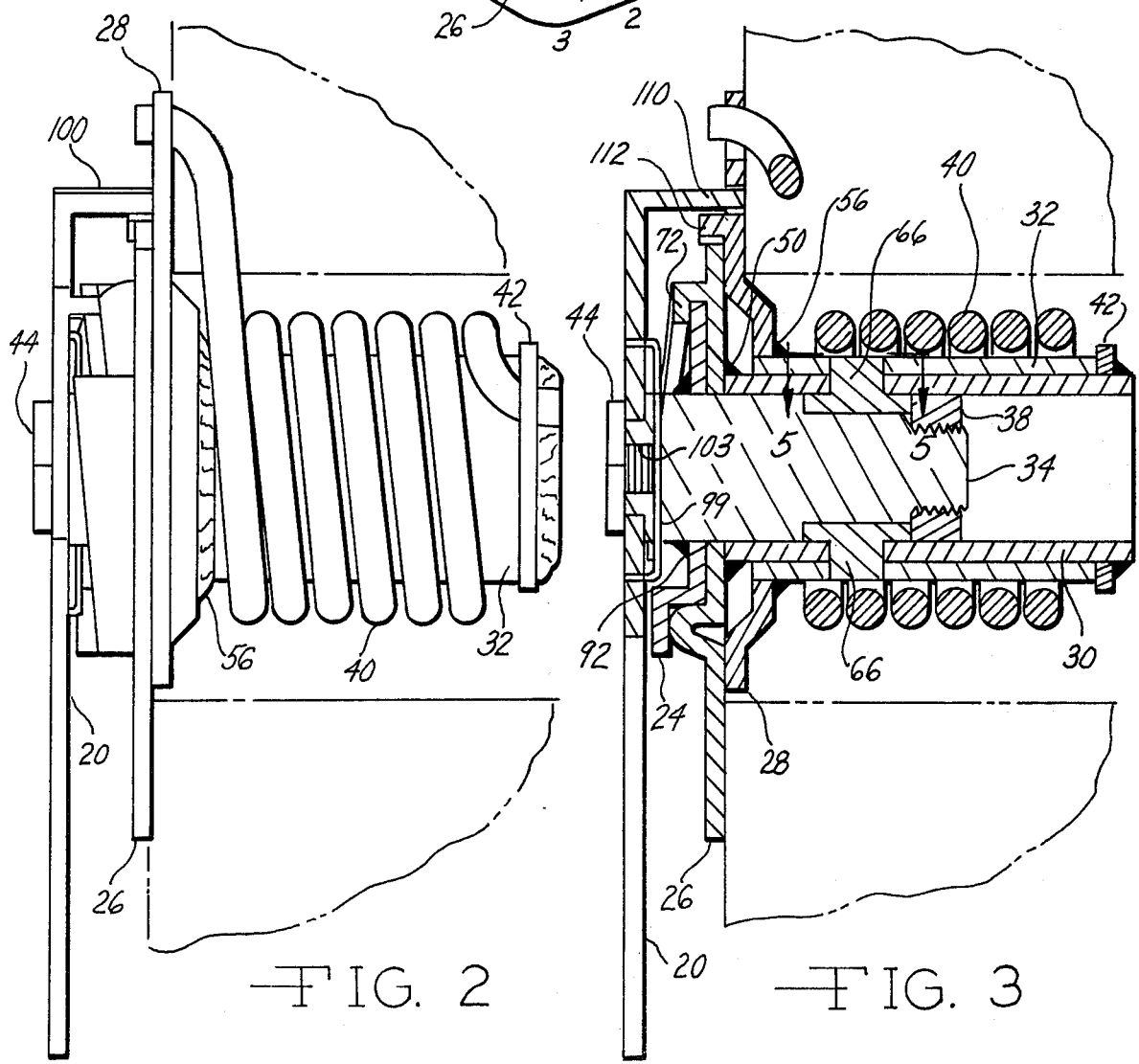

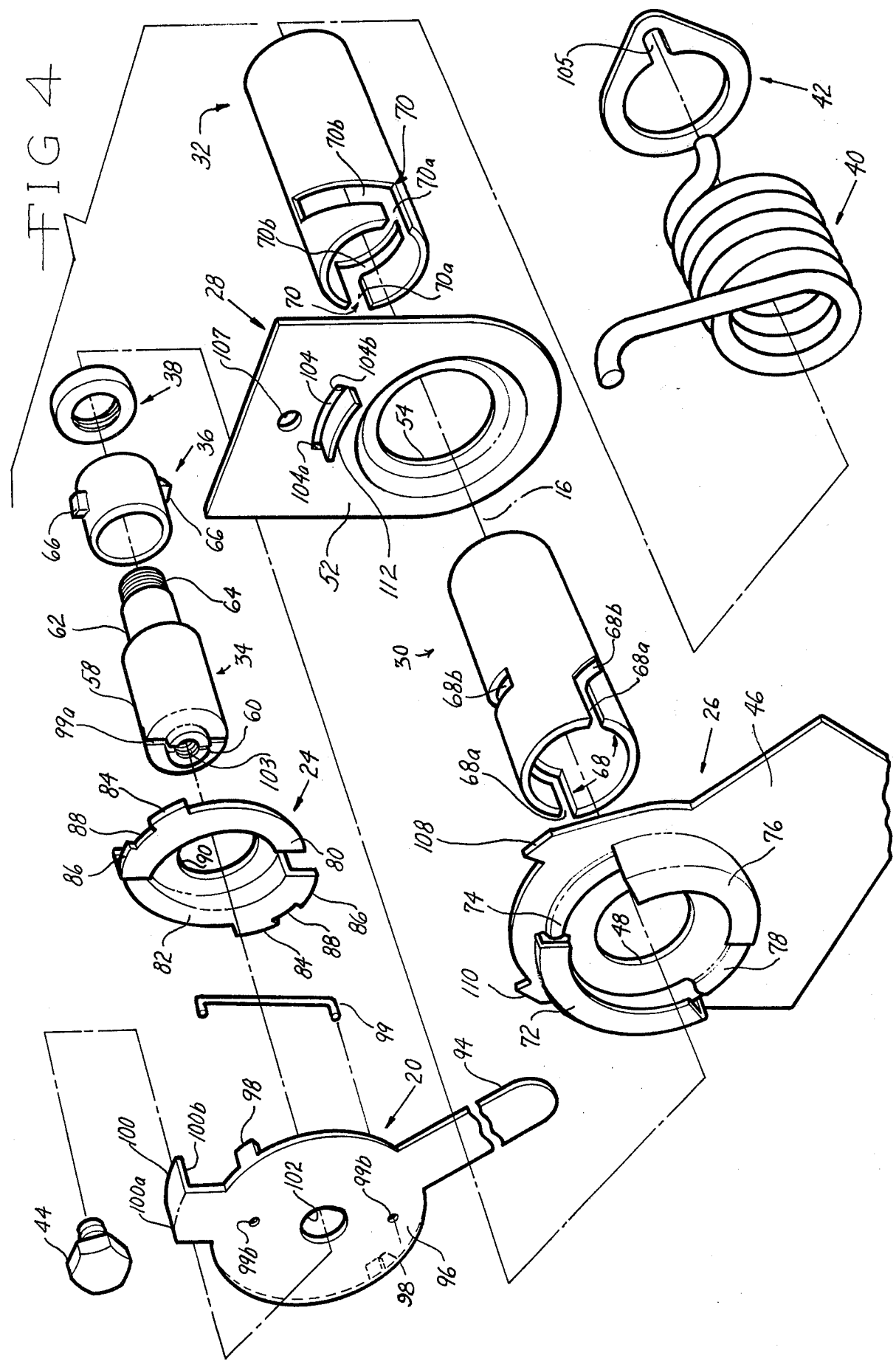

INFINITELY VARIABLE SEAT BACK RECLINER

BACKGROUND AND SUMMARY OF THE INVENTION

The present invention pertains to a seat back recliner and in the preferred embodiment disclosed herein relates to an infinitely variable seat back recliner mechanism particularly well suited for use in automobile vehicle seats.

Seat back recliner mechanisms are frequently used in automobile seats. Such mechanisms allow the seat back to be reclined in relation to the seat cushion so as to provide a range of reclined seating positions for the occupant. Various types of seat back recliner mechanisms are known. Many of these mechanisms utilize toothed gears which are rotatable by means of an operating lever to establish the angular position of the seat back in relation to the seat cushion. Because it is typically necessary to lock the recliner mechanisms in place when a desired adjusted position has been obtained, these mechanisms further may employ locking devices, such as pawls, which engage the toothed gears of the reclining mechanism. Such a reclining mechanism establishes a number of discrete angular positions at which the seat back may be locked. Hence, it cannot provide a continuous range of adjustment positions. A typical mode of operation for prior devices of this type involves the occupant having to release the pawl which locks the adjustment mechanism and then having to position the seat back either manually or by leaning back on it and then finally allowing the pawl to re-engage the reclining mechanism for locking it in place. Accordingly, in addition to the lack of a continuous range of adjustment positions, this prior type of mechanism may involve a certain inconvenience to the occupant.

The present invention is directed to a new and improved seat back recliner mechanism which provides an infinitely variable adjustment within an adjustment range, rather than a limited number of discrete adjustment positions. Moreover, the adjustment is accomplished by means of an operating lever which is effective to angularly position the seat back in one-to-one correspondence with operation of the lever. Operation of the lever alone is effective to position the seat back, and it therefore becomes unnecessary for the occupant to exert a direct force on the seat back to move it to the desired position. Once the desired position has been obtained through use of the operating lever, there is no further need for the occupant to perform any additional function in order to maintain the seat back in the selected position.

The reclining mechanism includes a wedging means which is effective to prevent the seat back from being angularly displaced from its set position when subjected to an external torque tending to rotate the seat back about the hinge axis. Yet, when the seat back is to be repositioned, all that is necessary is to operate the lever to bring the seat back to the new position. Thus, one attribute to the invention is that user convenience is promoted because all that is necessary to accomplish positioning of the seat back is for the user to move the operating lever to a new position. There are no separate latching or unlatching functions which are required. Furthermore, it is unnecessary for the occupant to bodily move the seat back either by leaning against it or manually, and indeed such attempts, if made, would not be successful in adjusting the seat back because the only way for the seat back to be moved is via the operating lever.

A further feature of the invention is that the mechanism is substantially compact which is an important consideration in an automotive vehicle seat. Many components of the mechanism can be fabricated from formed metal parts, and this is advantageous from the standpoint of mass production which would be associated with automotive usage. While an exemplary embodiment of the invention is disclosed herein, principles of the invention can be applied to other specific embodiments.

The foregoing features, advantages, and benefits of the invention, along with additional ones, will be seen in the ensuing description and claims which should be considered in conjunction with the accompanying drawings. The drawings disclose a preferred embodiment of the invention according to the best mode contemplated at the present time for carrying out the invention.

BRIEF DESCRIPTION OF THE DRAWINGS

FIG. 1 is a perspective view, taken from the right rear of an automotive vehicle seat containing a seat back reclining mechanism of the invention.

FIG. 2 is an enlarged fragmentary sectional view taken in the direction of arrows 2—2 in FIG. 1.

FIG. 3 is an enlarged fragmentary sectional view taken in the direction of arrows 3—3 in FIG. 1.

FIG. 4 is an exploded perspective view of the mechanism of FIGS. 2 and 3.

FIG. 5 is a fragmentary view taken in the direction of arrows 5—5 in FIG. 3.

DESCRIPTION OF THE PREFERRED EMBODIMENT

FIG. 1 shows an automotive vehicle seat 8 containing a seat back recliner mechanism 10 embodying principles of the present invention. Seat 8 comprises a seat cushion 12 on which the occupant seats himself or herself and seat back 14 against which the occupant places his or her back. FIG. 1 illustrates the seat back in the full upright position which is preferably slightly inclined rearwardly in the typical automotive vehicle for occupant comfort. The seat back is reclinable from the upright position about a horizontal pivot axis 16 in the direction indicated by the arrow 18. In the example of the disclosed embodiment, the angular range of reclination is approximately 60° from the position shown in FIG. 1 so that in the full reclined position, the seat back is disposed more closely to the horizontal.

Mechanism 10 is arranged coaxially with the hinge axis 16 and is located on the side of the seat cushion adjacent to the seat back. Assuming that the seat of FIG. 1 is a forwardly facing passenger seat, then typically the mechanism is located at the outboard side of the seat in relation to the vehicle. The seat is suitably anchored to the floor of the vehicle by means of structure within the seat which is not shown. Typically, there may also be a seat track on which the seat is slidable fore and aft in the vehicle. The seat back is angularly adjusted about hinge axis 16 by means of an operating lever 20 which is conveniently available for grasping by the seat occupant. In order to recline the seat back in the sense indicated by arrow 18, lever 20 is rotated in the same sense as indicated by the arrow 22.

The relationship is such that there is a one-to-one correspondence between the angular displacement of lever 20 and the resultant angular displacement of seat back 18. In other words, if lever 20 is moved a full 60° there is a corresponding full 60° movement of the seat back to the full reclined position. In accordance with the invention, the seat back is positionable anywhere within this angular range by correspondingly positioning lever 20; hence, the infinitely variable capability.

Detail of mechanism 10 is shown in the remaining drawing figures. For convenience in explaining the example disclosed herein, the term axial refers to the hinge axis 16; the axially outboard direction is towards the left in FIGS. 2 through 5; and the axially inboard direction toward the right. With reference to FIG. 4, mechanism 10 further includes an outer screw plate 24, an inner screw plate 26, a back plate 28, an inner cam tube 30, an outer cam tube 32, a drive shaft 34, a pin ring 36, a lock nut 38, a counterbalance spring 40 and a retainer ring 42. A bolt 44 is used for attaching lever 20.

The mechanism is assembled to seat 8 with inner screw plate 26 being secured to seat cushion 12 and with backplate 28 being secured to seat back 14. The attachment of these two components of the mechanism to the respective seat components may be accomplished in conventional fashion using fasteners, welding or other conventional techniques, and details of the attachment are omitted from the drawing in the interest of clarity. Typically, the two elements 26 and 28 will be secured to structural components in the cushion and back respectively.

Inner screw plate 26 comprises a main body 46 of generally flat expense. A circular hole 48 is provided in the flat main body at the illustrated location. Inner cam tube 30 is a circular cylindrical tubular element having an inside diameter corresponding to the diameter of hole 48. The axially outboard end of tube 30, left hand end as viewed in FIG. 4, is disposed directly against the inboard face of element 26 concentric with hole 48, and the two components are secured together by any suitable means, such as for example by means of a weld 50 (see FIG. 3). Outer cam tube 32 is also of a circular cylindrical tubular configuration, and its inside diameter is just slightly greater than the outside diameter of tube 30, allowing tube 32 to fit closely over tube 30 in telescopic fashion.

Back plate 28 comprises a generally flat main body 52. A circular hole 54 is provided in the body of the back plate in a portion which has been depressed in the inboard direction. The diameter of hole 54 allows the outboard end of tube 32 to be inserted snugly into the hole. Tube 32 is securely joined to back plate 28 by means of a weld 56 at the joint between the two as shown in FIGS. 2 and 3. Hence, the detailed structure of the mechanism described thus far is such that the two tubes 30, 32 define a hinge joint for the seat back about axis 16 whereby when the seat back pivots, tube 32 rotates on tube 30. Drive shaft 34 is a generally circular cylindrical element having a circular main body portion 58 whose diameter is just slightly less than the inside diameter of tube 30. A circular boss 60 is provided at the left-hand axial end of main body 58 as viewed in FIG. 4 while the right-hand end comprises a diametrically reduced circular cylindrical portion 62 and a threaded portion 64 at the far right-hand end.

The inside diameter of pin ring 36 is dimensioned to fit onto the diametrically reduced portion 62 of drive shaft 34. The pin ring is axially secured in place on the drive shaft by threading the lock nut 38 onto the threaded portion 64. As can be seen best perhaps in FIG. 3, the outside diameters of portion 58, of pin ring 36, and of lock nut 38 are identical so that all fit closely within the interior of inner cam tube 30.

Pin ring 36 includes a pair of pins 66 diametrically opposite each other on the outer cylindrical surface of the pin ring. The two pins are identical, and as shown in FIG. 5 each has a generally four-sided shape.

The two cam tubes 30, 32 comprise respective pairs of slots 68 and 70, the two slots of each pair being placed 180° from each other. Each slot 68 in tube 30 may be considered as comprising a straight segment 68a and a helical segment 68b. Each slot 70 in tube 32 comprises a straight segment 70a and a helical segment 70b. The straight segments 68a, 70a are for assembly purposes; the helical segments 68b, 70b are effective during question of the mechanism. The arrangement of the two cam tubes is such that one of the slot segments 70b overlies a corresponding one of the slot segments 68b and the other slot segment 70b similarly overlies the other slot segment 68b. Each overlying and underlying slot define at their intersection, when viewed radially, a four sided opening through the two tubes within which a corresponding one of the pins 66 is disposed. As can be seen in FIG. 3, the radial dimension of each pin 66 is such that it engages both slot segments 68b, 70b with the pin terminating substantially flush with the outside of outer cam tube 32.

It will be observed that slot segment 68b has a lead which runs in a clockwise sense as viewed from the outboard or left-hand end while each slot 70b runs in a counterclockwise sense when viewed from the same end. The lead of each slot 68b, 70b is identical. The angular span about axis 16 of each segment 68b, 70b is somewhat greater than 60°. With the outer screw plate 24 and the backplate 28 angularly related as shown in FIG. 4 (corresponding to the seat back in the upright position) the relative angular relation of each slot 68 to the corresponding slot 70 is such that the intersection of each slot segment 70b with the corresponding slot segment 68b is at an inboard limit. As the seat back inclines with back plate 28 and cam tube 32 rotating in the counterclockwise as viewed in FIG. 4 relative to outer screw plate 24 and cam tube 30, the intersection between each slot segment 70b and the corresponding slot segment 68b follows a helical path running outboard in the counterclockwise sense. In view of the fact that the pins 66 are constrained to follow these intersections, it will be perceived that there is a corresponding tracking of the pin ring. Hence, it will be further perceived that there is a corresponding axially outboard translation of the pin ring, and hence of the drive shaft. The manner in which the actual translation is caused by the mechanism of the present invention will become apparent later on. At this point, it can be mentioned that the driving force of translating the pin ring axially is normally imparted by operation of lever 20 during positioning of the seat back, and such translation allows the adjustment to take place. However, the interaction between cam tube 32 and pin ring 36 is important in preventing the seat back from being moved when external torques are applied to the seat back without the lever being operated. This will be seen in the later description.

Inner screw plate 26 is provided with a double lead female screw thread comprising four distinct screw sections 72, 74, 76, 78. These sections are formed integrally with the inner screw plate. The two sections 72, 76 are formed, in cross section, as right angled flanges from the main body. Each has an angular extent about axis 16 of approximately 120° and the two are diametrically opposite each other. The two sections 74 and 78 have angular extents about axis 16 of approximately 60° each. The two sections 74,78 are formed as beads from the material of the screw plate. This construction provides a lead which extends inboard in the clockwise sense.

Outer screw plate 24 is constructed to thread into the double lead screw thread of the inner screw plate and for this purpose comprises two separate screw sections 80 and 82 respectively which have approximately 180° arcuate extents. The lead of the sections of the outer screw plate corresponds to that of the mating sections of the inner screw plate. With the two screw plates 24,26 in the same relative angular positions as shown in FIG. 4, but in threaded engagement with each other, the portion of section 80 from about the 2 o'clock position to about the 6 o'clock position engages the corresponding section 76 while the portion of section 82 beginning at about the 8 o'clock to about the 12 o'clock position engages the section 72. The sections 74 and 78 are disposed against the inboard surface of each screw section 80 and 82 with the section 74 disposed against the portion of section 80 running from about the 12 o'clock position to about the 2 o'clock position and the section 78 disposed against the portion of section 82 which runs from about the 6 o'clock position to about the 8 o'clock position. If the outer screw plate is rotated in a counterclockwise sense as viewed in FIG. 4 relative to the inner screw plate, the interaction between the two plates is such that the outer screw plate translates axially outboard relative to the inner screw plate.

It will also be observed that each section 80,82 of outer screw plate 24 is provided with a pair of circumferentially spaced tabs 84,86, each pair defining a radially outwardly facing slot 88. The two slots 88 are diametrically opposite each other. The tabs 84 also form abutments with the counterclockwise ends of the sections 72, 76 to limit the clockwise rotation of the outer screw plate with respect to the inner screw plate if the former were to be screwed that far into the latter.

In assembly, the outer screw plate is threadedly engaged with the inner screw plate and the outer screw plate is secured to the drive shaft 34. A circular hole 90 allows the outer shaft plate to just fit over the cylindrical portion 58 of the drive shaft, and the outer screw plate is welded to the drive shaft by means of a weld 92 as shown in FIG. 3.

Considering the construction described thus far, it will be recognized that as outer screw plate 24 rotates in the counterclockwise sense, as viewed in FIG. 4, there is a corresponding axial translation of drive shaft 34 in the outboard sense, and hence translation of pins 66 in the same outboard sense. However, it is not this outboard translational movement of the drive shaft acting via the pins which causes relative rotation of the outer cam tube with respect to the inner cam tube. Rather, the purpose of the mechanism, in this respect, is to provide a correlation of the axial position of the pin ring with the rotational position of the outer screw plate relative the inner screw plate so as to permit the seat back to be positioned directly by means of lever 20 when it is desired to move the seat back.

It is therefore now appropriate to consider the operative association of lever 20 in the mechanism. Lever 20 comprises an operating handle 94 which projects radially from a generally circular body 96. Disposed on the periphery of the body are a pair of tabs 98 which are diametrically opposite each other, and at right angles to the circular lower body. A right angle tab 100 is also provided on a short arm on the periphery of the lower body. A circular hole 102 through the lever provides for the lever to be mounted directly against the left-hand end of the cylindrical portion 58 of the drive shaft 34 with the boss 60 fitting closely within the hole 102. Bolt 44 is threaded into a threaded hole 103 in the drive shaft to secure the lever. In the assembled mechanism, the lever is disposed slightly outboard of the two screw plates 24,26.

With lever 20 in the angular orientation shown in FIG. 4 relative to the inner and outer screw plates and to back plate 28 as well, tabs 98 are disposed within slots 88 in the assembled mechanism. It will be observed that back plate 28 is also provided with a slot 104 within which the tab 100 is disposed. The connection provided between operating lever 20 and back plate 28 by means of the tab 100 and slot 104 connection provides the means by which lever 20 directly operates the seat back. Ignoring for the moment any lost motion between the tab and slot connection, and also ignoring the effect of the rest of the mechanism already described, one can perceive that rotation of lever 20 from the illustrated position in the counterclockwise sense will produce a corresponding angular displacement of back plate 28. Hence, lever 20 is effective to secure a one-to-one correspondence between the position of the lever and the position of the seat back. However, because of the construction of the mechanism as already described, there is a certain interaction between the other component parts. Specifically, the interaction is such that the seat back can be positioned about axis 16 only by applying an external force to the operating lever. In other words, if external torques are applied to the seat back attempting to rotate it about axis 16, the seat back will not move. Thus, the mechanism is effective to secure a desired adjustment position of the seat back simply by rotating lever 20 to a corresponding position. If the occupant leans in any significant amount against the seat back, such would constitute an external torque applied to the seat back, which would possibly impair the positioning depending upon the magnitude of the force applied to the seat back. Once the desired position has been obtained, the seat back remains in the selected position until lever 20 is again operated to move it to a new position. This means that in the event of certain external disturbances, such as certain types of collisions, the seat back remains in place, which is desirable.

In order to minimize the force which must be applied to the lever by the occupant, it is very advantageous to incorporate a counterbalance to the weight of the seat back. One way for doing this by the counterbalance spring 40. The short leg of the spring fits within a radial slot 105 in retaining ring 42 while the long leg fits into a hole 107 in back plate 28. The helical coils of the spring are disposed around the outer cam tube.

In further considering the operation of the mechanism let it be assumed that the seat back is in the full upright position with lever 20 and back plate 28 in the positions corresponding to those shown in FIG. 4. Also let it be assumed that there is perfect counterbalance of the seat back by spring 40. If lever 20 is operated in the counterclockwise sense so that the far side edge 100a of tab 100 abuts the far edge 104a of slot 104, there is a direct coupling of the counterclockwise rotation of the lever to the backplate 28. Accordingly, the seat back 14 reclines in the direction of arrow 18. At the same time that the direct connection between the lever and the back plate is occurring, the tabs 98 are correspondingly rotating outer screw plate 24 in the same counterclockwise sense. The counterclockwise rotation of the screw plate corresponds directly in a one-to-one relationship with the rotation of the lever and of the seat back. There occurs a corresponding axial translational displacement of drive shaft 34 in the outboard direction. In turn, pins 66 move a corresponding amount in the outboard direction which is correlated with the amount of rotation of the lever and of the seat back. Because inner cam tube 30 is affixed to inner screw plate 26, the pins 66 are constrained to follow the slot sections 68b as they translate outwardly. The lead of the slot sections 68b corresponds to the lead of the screw thread of the inner and outer screw plates. Hence, because of the correspondence for the illustrated profile of the slots, there is no substantial relative rotation, if any at all, between pin ring 36 and drive shaft 34 as the drive shaft translates. Concurrent with the motion of back plate 28 by tab 100 is counterclockwise rotation of outer cam tube 32. Because the lead of slot segments 70b is identical to the lead of slot segments 68b, the rotation of cam tube 32 with the seat back is in direct correlation with the translation of pins 66. Thus, as the seat back reclines in response to operation of the lever, there is no interaction between the pins 66 and the outer cam tube slot 70 which would impede the free positioning of the seat back by the lever.

Correspondingly, it will be recognized that with the seat back in an inclined position the opposite edge 100b of tab 100 engages the opposite edge 104b of slot 104 when it is desired to move the seat back toward the upright position. In such an instance, operation of the lever causes the outer screw plate to rotate in a clockwise sense relative to the inner screw plate and causes the drive shaft 34 and pins 66 to translate in the inboard direction. Tube 32 also rotates in the clockwise sense, and there is no interaction between slot segments 70b and the pins 66 which impedes the free positioning of the seat back toward the upright position by the lever.

Once a desired position of the seat back has been obtained through operation of lever 20, the seat back remains in the selected position. If an external force is exerted on the seat back resulting in a torque tending to rotate it in either direction about the hinge axis, there occurs an interaction between slot segments 70 and pins 66. In the case of clockwise rotation of the outer cam tube 32, pins 66 are urged axially inboard by the camming action. The urging of the pins 66 in the inboard direction is transmitted via drive shaft 34 to urge outer screw plate 24 axially against the inner screw plate 26. The lead of the two screw plates is small enough that an axial force of one against the other does not create any relative rotation; instead, one screw thread wedges against the other screw thread at a locking angle resisting any rotation between them. Correspondingly, due to such locking of the two screw plates 24 and 26, it becomes impossible for outer cam tube 32 to rotate on inner cam tube 30 in response to external torques applied to the seat back about axis 16. Hence, the seat back is effectively locked in position. If the external torque were applied in a counterclockwise sense, then the interaction between the slot segments 70b and pins 66 would be such as to urge the drive shaft in the outboard direction so that the outer screw plate wedges against the corresponding sections 72, 76 of the inner screw plate thereby locking the seat back against rotation.

It is preferable to mount the pin ring so that while axially constrained on the drive shaft, it is nonetheless free to rotate on the drive shaft. Hence, an external torque applied to the seat back creates no tendency for the drive shaft to be rotated by the pin ring. This means that external forces applied to the seat back and resulting in torque about the hinge axis are not coupled back through the lever to the outer screw plate. If the outer screw plate were to be rotated by such a feedback of an external torque, then it would turn in a direction which would tend to relieve the wedging action between the two screw plates and hence defeat the objective of locking the seat back in place against external torques applied to the seat back.

Similarly, provision must be made to negate the possibility of the locking action becoming self-defeating by virtue of the connection between back plate 28 and lever 20 provided by the tab 100 and slot 104 connection. If the lever were to be rotated by the back plate in response to an external torque applied to the seat back (and in this regard it should be recognized that there will most likely be some slight angular rotation of the back plate simply due to the build up of tolerances between the component parts involved), then any motion imparted to the outer screw plate by the lever via tabs 98 and slots 88 would be in a direction which would tend to relieve the wedging action between the two screw plates thereby rendering the mechanism self-defeating. In order to avoid this type of interaction between the back plate and the lever a small lost motion connection is provided by making the angular span of slot 104 about axis 16 slightly greater (4 degrees for example) than the angular span of tab 100. Also is it desirable to render the lost motion coupling effective in both directions by means of a centering spring arrangement which tends to naturally center the tab 100 with respect to the slot 104. In this way the back plate is allowed to move a small amount (2 degrees) in either direction without imparting any motion to the lever. This ensures that the wedging action will always take place to lock the seat back before it could possibly be relieved by an operation of the outer screw plate via the lever.

The centering spring arrangement comprises a formed wire spring element 99 which fits within a diametrical slot 99a in the left hand end of drive shaft 34. Both ends of the spring element are turned 90° to its main length to pass through holes 99b in lever 20. The holes are located in relation to tab 100 such that when spring element 99 is in the unflexed condition, tab 100 is centered with respect to slot 104. The spring element flexes as the lost motion is taken up.

The mechanism promotes operator convenience because all that is necessary for the occupant to do when he desires to adjust the seat back is simply to move lever 20 to a position which results in the corresponding desired positioning of the seat back. There are no separate latching or locking functions which have to be performed by the occupant before or after he operates the lever. Once he has moved the lever to the desired position, the seat back remains in the corresponding position until the lever is once again operated. When adjusting the seat back, the occupant should not exert any force on it which could constitute an external torque tending to wedge the two screw plates into locking engagement with each other thereby resisting the desired rotation of the seat back. If such an external force were applied, then the mechanism would be effective to lock the seat back against such attempted rotation.

With regard to the counterbalance function provided by spring 40, it may be noted that if the counterbalance were perfect the seat back would always remain precisely in the position to which it had been set by the lever. In the set position there would theoretically be no wedging action between the two screw plates. However, if any external torque were applied to the seat back, wedging action would take place so as to lock the seat back in position. It will be recognized that when this happens there may be a corresponding slight angular movement of the seat back due to the tolerances between the component parts which must be taken up before the wedging action becomes effective. In a situation where the counterbalance is perfect, once the seat back has been positioned the release of the lever will cause a slight movement of the lever relative to the back plate due to the centering action of the spring acting between tab 100 and slot 104. In a situation where the counterbalance is not exactly perfect, the frictional forces between the interacting component parts may be sufficient to hold the seat back in place once the lever is released. Once again the lever will tend to be centered with respect to the back plate once it is released. Where there is a larger discrepancy in the counterbalance, then once the lever is released there may be a very small angular displacement of the seat back due to the net torque acting on it, which causes the screw plates to interact in a wedging action so that the seat back is locked in position. In view of these various contingencies it will be recognized that with any given construction of a mechanism embodying principles of the invention, there may be very small differences in actual interaction among the various component parts depending upon the tolerances involved and the relative magnitude of the forces exerted. However, in all instances the basic principles of the invention will provide that a locking wedging action will occur whenever an external torque is applied to the seat back while adjustment of the seat back is possible only by operation of the lever.

It was noted earlier that the angular range of adjustment is approximately 60 degrees. In order to define this range radially projecting limit stops 108, 110 are provided on the periphery of the inner screw plate. The stops are located in the path of travel of the tab 112 which is turned outwardly from the body of back plate to form slot 104. The stops are circumferentially spaced to allow for the 60 degree rotation of the back plate.

In the example of the preferred embodiment the lead of the slot segments 70b is relatively small. Hence, rotation of cam tube 32 exerts a camming action for readily urging pins 66 axially in response to rotation of the outer cam tube. By profiling slot segments 68b with the same lead as segments 70b, interaction between inner cam tube slots and the pins consequently reinforces the initial interaction between outer cam tube slots and the pins when an external torque is applied to seat back. Because the lead of the slot segments 68b corresponds to that of the inner and outer screw plate, there is theoretically no relative rotation of the pin ring on the drive shaft. Hence, it would be possible using the illustrated profile for slot 68b for the mechanism to be designed with the pins non-rotatably mounted relative to the drive shaft. The preferred practive, however, is to rotatably mount the pin ring as shown. With the pin ring mounted for rotation, the shape of the slots of the inner cam tube becomes less important. While it is desirable to have identical leads, but in the opposite sense, between the two slot segments 68b, 70b, other configurations are certainly possible.

One way of assembling the constituent parts is to first assemble pin ring 36 onto drive shaft 34 using nut 38. The outer screw plate is assembled on to the drive shaft and welded in place. Next, the two screw plates are threaded together. The inner cam tube is next inserted onto the drive shaft and pin ring assembly where it is welded to the inner screw plate, pins 66 passing through the slot segments 68a and into the slot segments 68b during the process. The outer cam tube is welded to the back plate, and the inner cam tube, including the drive shaft and pin ring assembly, is inserted into the outer cam tube with the pins 66 passing through the slot segments 70a and into the slot segments 70b. With the two cam tubes telescoped together the retaining ring 42 and counterbalance spring 40 are positioned in place with the retaining ring being welded to the right hand end of the inner cam tube. Spring element 99 is lodged in slot 99a, and the lever 20 is finally assembled to the drive shaft by bolt 44.

In view of the foregoing description, the overall operation of the mechanism may be summarized as follows. Between lever 20 and seat back 14 there exists two independent force transmission, or kinematic, paths. One is between the lever and back plate 28 via tab 100 and slot 104, the other from the lever through the drive shaft and pin ring to the outer cam tube and back plate. When the lever is operated, the active path is from the lever to the back plate 28 via the tab 100 and slot 104 connection. While force is being transmitted through this path from the lever to the seat back in order to position the seat back, the other path is inactive in transmitting force, but pins 66 are being concurrently manipulated so as to preclude the occurence of any wedging action tending to interfere with the desired rotation of the seat back by the lever. When an external torque is applied to the seat back about the hinge axis, then the external torque is coupled through the outer cam tube which in turn causes a wedging action between the two screw plates to lock the seat back; no force is transmitted from the seat back to the lever via the slot 104 and tab 100 connection.

While a preferred embodiment has been disclosed, other embodiments are fully contemplated within the scope of the invention. Such other embodiments may have other forms of wedging means and camming means, by way of example.

What is claimed is:

1. In a seat having a cushion and a back which are relatively angularly positionable about a hinge axis, an infinitely variable mechanism which, by means of an operating lever, relatively positions the back and cushion about the hinge axis to any angular position within a range of angular positions and which for any angular position to which the two have been positioned by the operating lever disallows the two from being further angularly displaced except by subsequent operation of the lever, said mechanism comprising wedge means operatively coupled between the back and the cushion comprising a pair of wedging members which, at any relative angular position between the back and cushion within said range, in response to application of an external torque to the back and cushion about the hinge axis other than via the operating lever, wedge together to disallow angular displacement between the back and cushion, and means operatively coupling the lever, the wedge means, the seat cushion and the seat back such that operation of the lever is effective to freely angularly position the back and cushion about the hinge axis without the two wedging members disallowing the relative rotation.

2. A mechanism as set forth in claim 1 wherein the wedge means is manipulated by operation of the lever so as not to disallow the desired rotation when the lever is operated.

3. A mechanism as set forth in claim 2 wherein one of the wedging members is rotated by the lever relative to the other wedging member.

4. A mechanism as set forth in claim 3 wherein the two wedging members are complementary threaded members threaded together.

5. A mechanism as set forth in claim 1 wherein a cam and cam follower mechanism couples relative external torques applied between the back and the cushion to the wedge means causing the wedge means to lock and thereby prevent relative rotation between the back and cushion in response to such external torques.

6. A mechanism as set forth in claim 5 wherein the cam is a slotted tube which rotates with the seat back relative to the cushion and the cam follower is a pin disposed in the slot of the slotted tube.

7. A mechanism as set forth in claim 6 wherein the pin is disposed on a drive shaft which is urged to translate axially along the hinge axis by the slotted tube in response to occurrence of such external torques.

8. A mechanism as set forth in claim 7 wherein the pin is a separate member which is capable of rotating on the drive shaft.

9. A mechanism as set forth in claim 7 wherein the wedge means is manipulated by the lever to axially translate the pin so that the pin does not interfere with the slotted tube in such a way as to disallow rotation between the seat back and seat cushion when the lever is operated.

10. A mechanism as set forth in claim 9 wherein motion of the lever is imparted to the seat back via a connection independent of the drive shaft which includes a small amount of lost motion, the small amount of lost motion preventing external torques applied between the seat back and cushion from being fed back to operate the lever when the lever is not intended to be operated by the seat occupant.

11. A mechanism as set forth in claim 10 including a counterbalance associated with the mechanism for counterbalancing the seat back in relation to the seat cushion.

12. A mechanism as set forth in claim 11 wherein the counterbalance comprises a counterbalance spring.

13. A mechanism as set forth in claim 6 including a second tube with respect to which the slotted tube is telescopically arranged.

14. A mechanism as set forth in claim 13 wherein the pin is disposed on a drive shaft which is disposed within the second tube.

15. A mechanism as set forth in claim 14 wherein one of the wedging members is disposed on the drive shaft and rotates in unison with the drive shaft.

16. A mechanism as set forth in claim 14 wherein the lever is attached to the drive shaft and the lever and the drive shaft rotate in unison.

17. A mechanism as set forth in claim 15 wherein the slotted tube is affixed to a back plate and the lever includes a connection to the back plate independent of the slotted tube, said connection coupling motion of the lever to the back plate, said connection including a small amount of lost motion.

18. A mechanism as set forth in claim 16 wherein the second tube is affixed to a member which includes the other wedging member.

19. A mechanism as set forth in claim 17 wherein the two wedging members are threaded members which are threadedly engaged with each other.

20. A mechanism as set forth in claim 18 wherein the lead of the two threaded members corresponds to the lead of the slot in the slotted tube.

21. A mechanism as set forth in claim 18 wherein the lever is keyed to one of the two threaded members constituting the one wedging member.

22. A mechanism as set forth in claim 1 wherein the back and the cusion are angularly positionable in one-to-one correspondence with angular rotation of the operating lever.

23. In a seat having a cusion and a back which are relatively positionable about a hinge axis, an infinitely variable mechanism for relatively positioning the back and the cushion about the hinge axis to any desired position within a range of positions comprising an input member for establishing the desired position, and an output member corresponding to the desired position, and first and second means defining respective first and second independent kinematic paths between the input and the output members, said first means being rendered active during operation of the input member to effect corresponding operation of the output member, said second means being rendered inactive during operation of the input member but active in response to external torques applied to the output member to lock the output member in the position to which it has been set by operation of the input member, said first means being rendered inactive in response to such external torques.

* * * * *